Aug. 30, 1927.
J. R. WINTER
VEHICLE WHEEL
Filed June 7, 1921
1,640,523
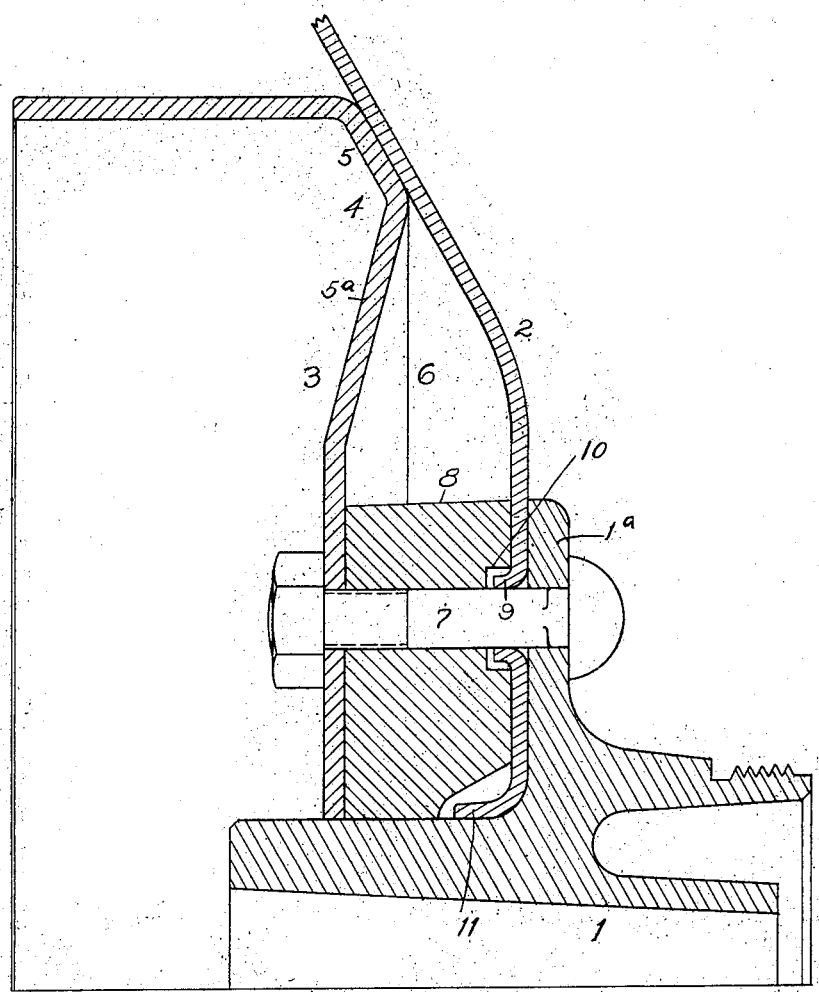
Witnesses
Theo. S. Terwilliger
Florence Knudsen
Inventor
John R. Winter
By Clark C. Wever
Attorney.

Patented Aug. 30, 1927.

1,640,523

UNITED STATES PATENT OFFICE.

JOHN R. WINTER, OF LANSING, MICHIGAN, ASSIGNOR TO MOTOR WHEEL CORPORATION, OF LANSING, MICHIGAN, A CORPORATION OF MICHIGAN.

VEHICLE WHEEL.

Application filed June 7, 1921. Serial No. 475,797.

My invention relates to automobile wheels of the disk type and more especially to wheels of that type in which a curved disk is employed. Its purposes are to so construct the brake drum used with such wheels as to make it not only serve the purposes of a brake drum, but also as a yielding support to the disk.

It has been customary heretofore to employ a rigid support for that purpose, but I have found it more desirable to make the support slightly yielding and my present invention consists in combining this support with the brake drum. By this means I am able not only to accomplish this result, but also to hold the brake drum itself more firmly in position and make the entire construction cheaper, neater and more effective and the wheel itself more resilient. The drawings show a vertical section through one-half of the hub and brake drum of a wheel, the outer part of the disk being removed as forming no part of my invention.

In the drawings 1 is the hub of the wheel, which may be of any approved construction, and 2 is the disk which may also be of any approved type but is preferably curved toward the rear near the hub as shown in the drawings. 3 is the brake drum, which is of the usual type except that the bottom is pressed forwardly so as to make a depression 4 with reversely dished portion 5, 5ª. The portion 5 bears against and supports the disks 2, said portion 5 being shown substantially conical shape to conform in shape to the adjacent portion of the disk that contacts therewith, and said portion 5 being of such a length and so positioned that its inner extremity is substantially at the median line 6 of the wheel. Between the inner central portions of the disk 2 and the brake drum 3 is a spacing and reinforcing member 8. The disk 2, the spacing and reinforcing member 8, and the brake drum 3 are all clamped firmly together to an annular flange 1ª of the hub 1 by bolts 7 passing through the parts, the brake drum 3 being held in position relative to the disk 2 with its portion 5 in supporting contact with the disk. The disk itself is pressed inwardly as shown at 9 in the bolt holes through which the bolts 7 pass, a depression 10 being formed in the spacing and reinforcing member 8 to receive the projection 9, and the disk is also pressed inward at its inner extremity 11 and a portion of the filler is cut away to receive the flange, this construction serving to more securely anchor the parts together and lending increased strength to the structure.

By this construction the brake drum and disk mutually support each other and at the same time the arched construction of the bottom of the brake drum makes it slightly yielding and so adds to the resiliency of the wheel at the same time giving sufficient stiffness to prevent distortion or wabbling, and, by the dishing construction of both the brake drum 3 and the disk 2, preventing any outward pressure against the felly or rim.

By the use of the term "yielding" as applied to the disk support, it is not intended to convey the idea that the brake drum is itself flexible or that it gives under stresses applied to the disk, but rather that instead of the disk and its support being fixedly anchored to each other as by bolts or by a shoulder, the engagement is such as to permit of slight relative movement as the disk is stressed under load.

I claim as my invention and desire to secure by Letters Patent:

1. In a disk wheel, the combination of a hub having a flange, a disk on the hub having a disked portion, a brake drum on the hub comprising a dished peripheral portion and a main reversely dished portion inwardly thereof, the brake drum being arranged with the inner portion thereof spaced a substantial distance from the inner portion of the disk, the main dished portion of the brake drum being oppositely dished to and disposed opposite the dished portion of the disk in spaced relation therewith, and the dished peripheral portion of the brake drum extending at an inclination parallel with and in supporting contact with a section of the dished portion of the disk to permit slight relative movement between the contacting portions of the disk and brake drum, a spacing and reinforcing member between the inner portions of the disk and the brake drum, and means for clamping the spacing member, and the inner portions of the disk and the brake drum together to the hub flange.

2. In a disk wheel, the combination of a hub having a flange, a disk including a substantially flat hub-attaching zone and an outer rearwardly dished zone, a rear disk-support comprising a frusto-conical member including a central zone spaced from the flange and disk and a medial zone forwardly dished into the peripheral contact with the rearwardly dished zone of the disk and an outer zone extending parallel with and in free contact with the said disk along a line oblique to the wheel plane, and means to secure the hub flange and central zones of the disk and supporting member firmly in assembled position, the medial portion of the disk-supporting member presenting in section a strut arched in opposition to the curvature of the disk.

JOHN R. WINTER.